US005644171A

United States Patent [19]

Yumiyama et al.

[11] Patent Number: 5,644,171

[45] Date of Patent: Jul. 1, 1997

[54] STARTER HAVING AN ELASTIC SEAL MEMBER SHAPED TO TAPER IN A DIRECTION PERPENDICULAR TO THE LONGITUDINAL AXIS OF THE MOTOR

[75] Inventors: Shigeru Yumiyama; Shigehiko Omata, both of Hitachinaka; Takashi Suzuki; Yoshinobu Nakamura, both of Ibaraki-ken, all of Japan

[73] Assignee: Hitachi, Ltd., Tokyo, Japan

[21] Appl. No.: 498,421

[22] Filed: Jul. 5, 1995

[30] Foreign Application Priority Data

Jul. 28, 1994 [JP] Japan .................................... 6-176962

[51] Int. Cl.$^{6}$ .............................. F02N 15/06; H02K 5/10

[52] U.S. Cl. ............................ 290/48; 290/38 R; 310/88

[58] Field of Search .................................... 290/48, 38 R, 290/38 A, 38 B, 38 C, 38 D; 74/6, 7 R, 7 A, 7 B, 7 D, 7 E, 8, 9; 217/110; 310/85, 86, 87, 88, 89

[56] References Cited

U.S. PATENT DOCUMENTS

| | | | |
|---|---|---|---|
| 2,774,894 | 12/1956 | Antonidis et al. | 310/71 |
| 3,308,316 | 3/1967 | Pfahl | 310/87 |
| 4,104,550 | 8/1978 | Penhorwood | 310/71 |
| 4,356,735 | 11/1982 | Bögner et al. | 74/7 A |
| 4,495,825 | 1/1985 | Rühle | 74/7 E |
| 4,561,316 | 12/1985 | Bolz et al. | 74/7 E |
| 5,307,700 | 5/1994 | Spellman et al. | 74/7 A |

FOREIGN PATENT DOCUMENTS

| | | |
|---|---|---|
| 63-1459 | 1/1988 | Japan . |
| 63-16168 | 1/1988 | Japan . |

*Primary Examiner*—Thomas M. Dougherty
*Assistant Examiner*—Christopher Cuneo
*Attorney, Agent, or Firm*—Bardehle, Pagenberg, Dost, Altenburg, Frohwitter, Geissler & Partners

[57] ABSTRACT

A starter comprising: a shift lever for engaging and disengaging a pinion and a ring gear of an engine; a magnetic switch for actuating the shift lever; a motor for driving the pinion; a front case having an open end to which the magnetic switch and the motor are mounted substantially in the same direction, the pinion being enclosed in the front case; a seal portion provided in the vicinity of the open end of the front case so as to seal a gap which communicates between the inside and the outside of the front case; the seal portion including a taper face and an elastic material, the taper face having an axis of taper substantially perpendicular to the longitudinal axis of the motor, the elastic material being fitted onto the taper face so as to be disposed between the magnetic switch and the motor and so as to be urged in the direction along which a width of the taper face becomes narrower.

6 Claims, 7 Drawing Sheets

STARTER HAVING AN ELASTIC SEAL MEMBER SHAPED TO TAPER IN A DIRECTION PERPENDICULAR TO THE LONGITUDINAL AXIS OF THE MOTOR

BACKGROUND OF THE INVENTION

The present invention generally relates to a starter to be used, for example, in an internal combustion engine, and particularly, to a starter provided with a dust cover for protecting dust-proof and water-proof sealing parts disposed in the starter.

In a starter, generally, a magnetic switch is actuated to drive a shift lever to thereby make a pinion and a ring gear engage with each other. With this type of starter, the magnetic switch and a motor are mounted so as to close an open end formed in a front case with the axes of both the magnetic switch and the motor substantially parallel to each other. When assembled, the motor and magnetic switch close an open end of the front case except for a gap between the magnetic switch and the motor. A dust cover, which acts as a seal member, is attached to prevent dust and water from entering the inside of the front case through the gap.

Generally, the starter is assembled as follows. First, a pinion, a shift lever and a part of the motor are mounted in the front case. Next, a dust cover is attached. Finally, the magnetic switch and the body of the motor are attached. The dust cover is typically comprised of, for example, synthetic resin. The dust cover is fitted and fixed in the front case (or an intermediate member fixed in the front case which is hereinafter merely referred to as "intermediate member") in parallel with the longitudinal axis of the motor. Examples of this type of structure am described, for example, in JP-B 63-1459, and JP-A 63-16168.

In this configuration, the dust cover fits in the front case (or an intermediate member thereof) in parallel with the longitudinal axis of the motor as described in the above references. However, several problems arise from this configuration.

In order to seal the starter, it is desirable to make the outer size of the dust cover considerably larger than the size of a hollow in the front case (or an intermediate member) into which the dust cover fits. The difference in size increases the interference between the dust cover and the hollow so that the dust cover can be pushed and expanded into the hollow. If the interference is too large, however, the dust cover must be greatly deformed when the dust cover is fitted, so that assembly is difficult.

Alternatively, to ease assembly, it is desirable to make the outer size of the dust cover and the inner size of a hollow of the front case (or an intermediate member), into which the dust cover is to be fitted, agree with each other as well as possible. When the sizes are similar, the interference is small, so that the dust cover need only be marginally deformed when assembled. However, with less interference between the members, the dust cover is not expanded into the hollow to completely seal the staffer. Large interference between the parts is necessary to affect the seal between the dust cover and the case. Accordingly, the ease of assembly and the integrity of the seal are incompatible considerations. It is impossible to both easily assemble the dust cover into the front case and create a good seal.

Further, in order to ease assembly, a taper is formed in a hollow of the front case (or intermediate member) in parallel with the longitudinal axis of the motor so that the width of the hollow decreases in the fitting direction. The taper in the hollow of the front case (or intermediate member) makes it easier to assemble the dust cover. However, in order to create a dependable seal between the dust cover and the front case, it is necessary to increase the interference between the member because there is no means to push the back of the dust cover in the direction along which the taper becomes narrower, i.e., in the direction parallel to the longitudinal axis of the motor. Therefore, because the interference must be increased, the net affect of the taper is that ease of assembly is not improved.

SUMMARY OF THE INVENTION

It is therefore an object of the present invention to provide a staffer comprising an easily assembled dust cover which produces a good seal.

In order to achieve the above object, according to one aspect of the present invention, the starter comprises: a shift lever for performing an engagement and disengagement between a pinion and a ring gear of an engine; a magnet switch for actuating the shift lever; a motor for driving the pinion; a from case having an opening end to which the magnetic switch and the motor are mounted substantially from the same direction, the pinion being enclosed in the front case; a seal portion provided in the vicinity of the open end of the front case so as to seal a gap which communicates between the inside and the outside of the front case, the seal portion including a taper face and an elastic material, the taper face having an axis which is substantially perpendicular to the longitudinal axis of the motor, the elastic material being fitted into the taper face so as to be disposed between the magnetic switch and the motor and receives a force in the direction along which a width of the taper face becomes narrower.

In one embodiment, the taper face is formed on the front case wherein at least a part of a surface of the elastic material abuts against the magnetic switch, and wherein at least a part of a surface of the elastic material abuts against the motor.

In a further embodiment, the taper face is formed so as to be narrower from the magnetic switch toward the motor. The elastic material receives a force in the direction from the magnetic switch toward the motor.

In a further embodiment, the taper face narrows from the motor toward the magnetic switch. The elastic material receives a force in the direction from the motor toward the magnetic switch.

In another embodiment of the starter, the elastic material has protrusions on its surface which contact the taper face.

As described above, assembly of the starter is as follows: first, the pinion, the shift lever, and a part of a motor are mounted in the front case; second, the dust cover is attached; and third, the magnetic switch and the body of the motor are attached.

According to the starter of the present invention, a seal portion is provided in the vicinity of the open end of the front case. An elastic material is fitted onto a taper face in the axial direction which is substantially perpendicular to the longitudinal axis of the motor. The elastic material is disposed between the magnetic switch and the motor and receives a force in the direction in which the taper face becomes narrower. In the actual manufacturing process, therefore, the elastic material is fitted into the taper face after the pinion, the shift lever, and a part of the motor have been mounted in the front case. Subsequently, the magnetic switch and the motor are mounted onto the open end of the front case with the elastic material between the magnetic switch and the motor.

Thus, by mounting the magnetic switch and the motor in the final step, the elastic material is forced directly or indirectly in the direction along which the taper face becomes narrower. The elastic material is forcibly pushed and expanded into the deepest part of the taper face. This ensures a good seal between the elastic material and the taper face even if the interface between is not large. Thus, it is possible to easily assemble the elastic material with a light force because the elastic material is not significantly deformed until the final assembly step.

Further, as described above, the elastic material is firmly attached to the taper face even though the interference between is not significant because the elastic material is forcibly fit into the deepest part of the taper face in the final assembly step. Also, the interference between the elastic material and the taper face may be increased so as to improve the seal. Alternatively, the interference may be decreased so that the elastic material may be assembled with a light force without significant deformation. Thus, both the seal and assembly characteristics are improved.

Further, since the taper face is formed on the front case and at least a part of the surface of the elastic material which faces the magnetic switch abuts against the magnetic switch, and at least a part of the surface of the elastic material which faces the motor abuts against the motor, it is possible to urge the elastic material by means of the magnetic switch and the motor directly in the direction along which the taper face becomes narrower.

In a further embodiment, the taper face becomes narrower from the magnetic switch toward the motor. The elastic material is urged in the direction from the magnetic switch toward the motor so that the elastic material receives a force in the direction from the magnetic switch toward the motor. Alternatively, the taper face becomes narrower from the motor toward the magnetic switch so that the elastic material receives a force in the direction from the motor toward the magnetic switch. Accordingly, it is possible to have the taper face oriented with its axis perpendicular to the longitudinal axis of the motor so that the elastic material receives a force in the direction along which the taper face becomes narrower. In embodiments of the invention wherein the elastic material comprises protrusions on its surface which come into contact with the taper face, it is possible to firmly hold the elastic material in the taper face until the motor and the magnetic switch are mounted on the front case. This prevents the elastic material from coming off the taper face due to vibrations or the like during the manufacturing process.

DETAILED DESCRIPTION OF THE PREFERRED EMBODIMENTS

Referring to FIGS. 1–10B, embodiments of the present invention are described below.

First, a first embodiment of the present invention is described with reference to FIGS. 1–8.

Figure 1:
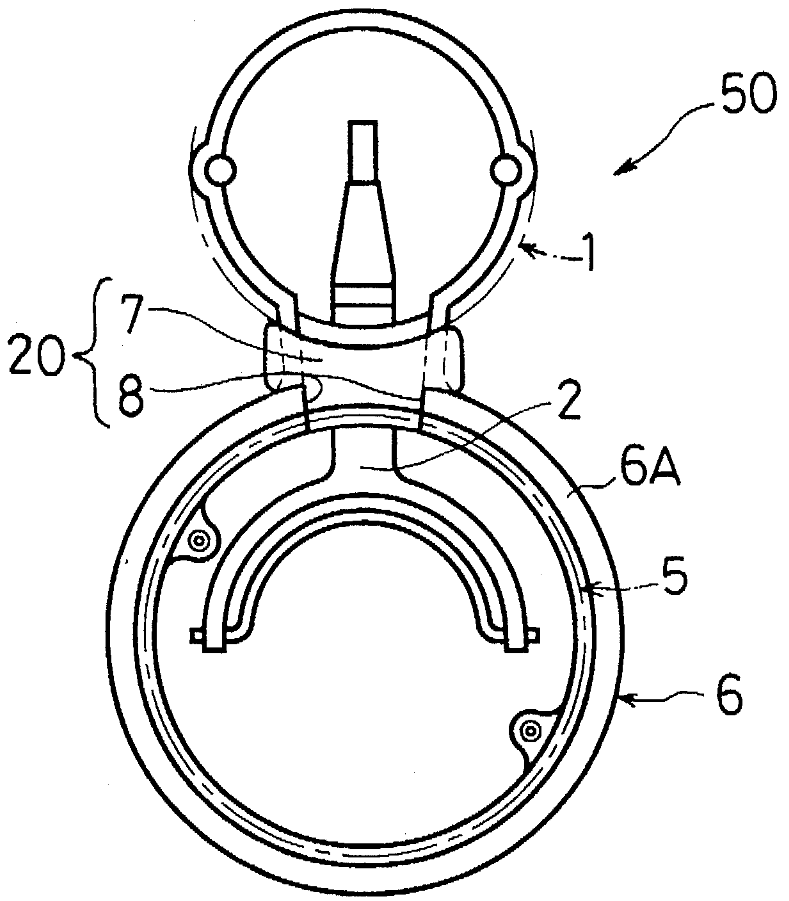
FIG. 1 is a view showing the starter according to a first embodiment of the present invention in which a magnetic switch and a motor are removed.
Figure 2:
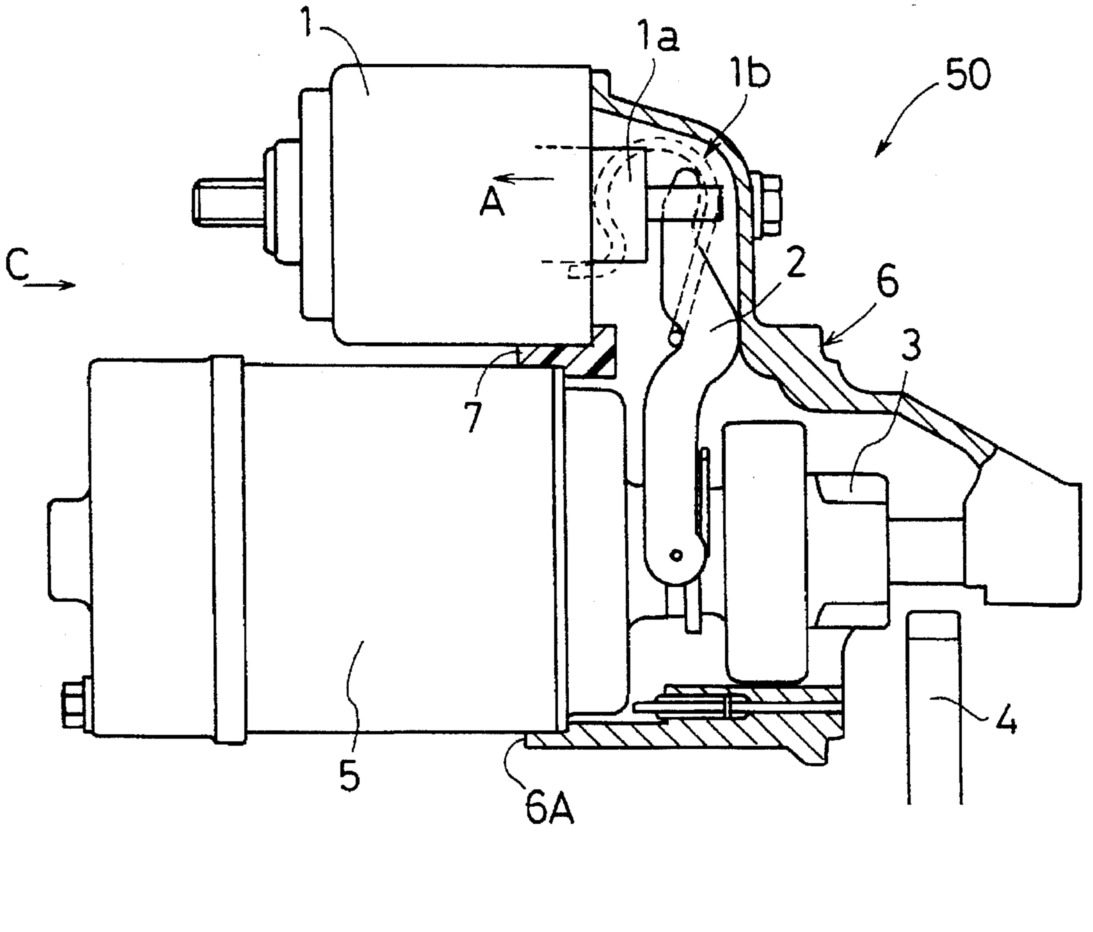
FIG. 2 is a side view, partly in section, of the starter according to the first embodiment of the present invention.

The structure of the starter of this embodiment is shown in FIGS. 1 and 2. FIG. 2 is a side view, partly in section, of a starter 50. FIG. 1 is a view showing the present invention in which a magnetic switch 1 and a motor 5 are removed from the starter 50 when viewed in the direction of arrow C in FIG. 2.

In FIGS. 1 and 2, the starter 50 includes a pinion 3 which is engageable with a ring gear 4 of the engine. A shift lever 2 engages and disengages the pinion 3 and the ring gear 4. The magnetic switch 1 attracts the shift lever 2 to actuate it. The motor 5 drives the pinion 3. The front case 6 encloses the pinion 3.

The magnetic switch 1 is provided with a plunger 1*a* which is attracted when the magnetic switch 1 is actuated. A torsion spring 1*b* is fixed with its one end to the magnetic switch 1. The shift lever 2 is supported at its pivotal point by the magnetic switch 1*b*. When a key switch (not shown) is turned on, the plunger 1*a* of the magnetic switch 1 is attracted in the direction of arrow A so that the pinion 3 is pushed by the shift lever 2 to the ring gear 4 so that it becomes engaged with the ring gear 4. Simultaneously, a moving contactor in the magnetic switch 1 is pushed by the plunger 1*a* to turn on the motor 5. The rotation of motor 5 is transmitted to the ring gear 4 through the pinion 3 to thereby start the engine.

The magnetic switch 1 and the motor 5 are mounted, from the left in FIG. 2, onto an open end 6A of the front case 6 positioned in the left side of FIG. 2. After the motor 5 and the magnetic switch 1 have been mounted to the open end 6A, a gap is formed between, which is sealed by a seal portion 20 provided in the vicinity of the open end 6A.

The seal portion 20 and the starter configuration are described below in detail.

In FIG. 1, the seal portion 20 comprises a taper face 8 formed in the front case 6. A dust cover 7 is fitted on the taper face 8. The axial direction of the taper face 8 is substantially perpendicular (substantially up/down direction in FIG. 2) to the longitudinal axis of the motor 5. The taper face 8 is gradually narrower from the magnetic switch 1 toward the motor 5 (downward in FIG. 2). With the dust cover 7 fitted onto the taper face 8, the taper face 8 constitutes a part of a seal surface.

Figure 3A:
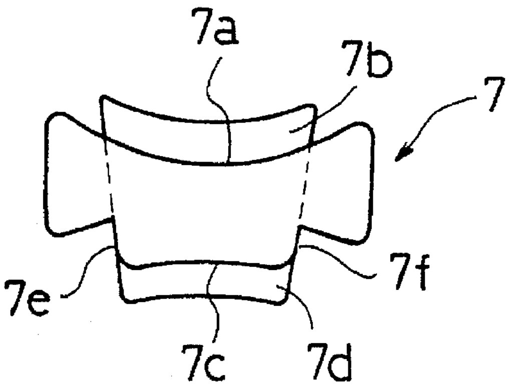
FIGS. 3A, 3B and 3C are front, side and top views of a dust cover respectively.
Figure 3B:
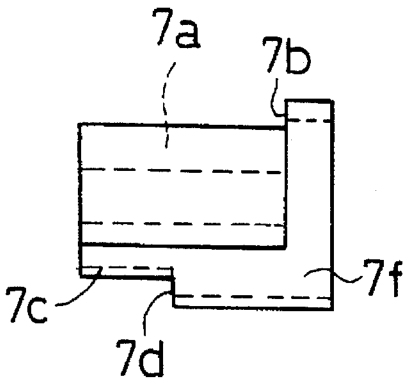
Figure 3C:
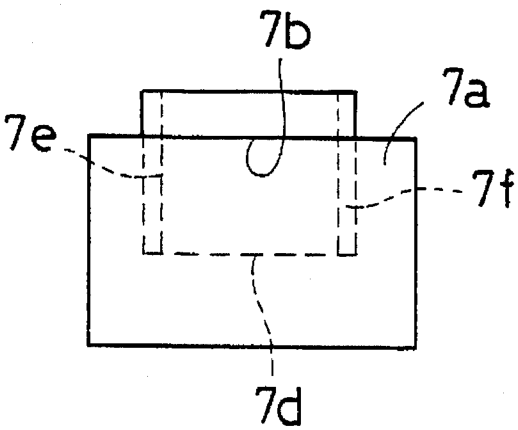

FIGS. 3A, 3B and 3C show the detailed structure of the dust cover 7. That is, FIGS. 3A, 3B and 3C are front, side and top views of the dust cover 7, respectively.

In FIGS. 1, 3A, 3B and 3C, the dust cover 7 comprises an elastic material made from, for example, synthetic resin or the like. The dust cover 7 comprises surfaces 7*a* and 7*b* which abut against the magnetic switch 1. It further comprises surfaces 7*c* and 7*d* which abut against the motor 5 so that the dust cover receives a force in the direction along which the width of the taper face 8 becomes narrower (downward in the drawing). The dust cover 7 further comprises surfaces 7*e* and 7*f* which abut against the taper face 8.

In this embodiment, the seal portion 20 completely seals the gap so that the inside and outside of the front case 6 communicate with each other. Thus, dust, water, etc. are prevented from entering the inside of the front case 6 where the plunger 1*a*, torsion spring 1*b*, shift lever 2, pinion 3, and so on are disposed.

With reference to FIGS. 4–8, the procedure for assembling the starter 50 in the actual manufacturing process is described for an embodiment of the invention described above.

Figure 4:
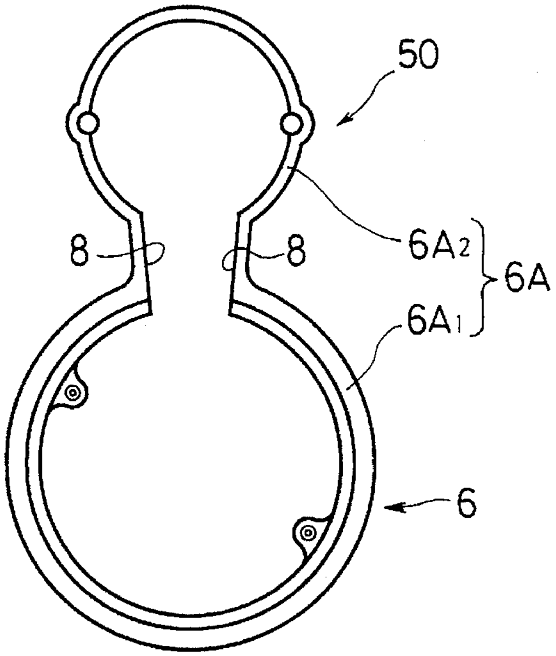
FIG. 4 is a view showing a front case when viewed from its open end.

First, FIG. 4 shows the front case 6 when viewed from the open end 6A with no parts attached to the front case 6. In FIG. 4, the open end 6A of the front case 6 comprises a substantially figure eight shape. The motor 5 is mounted to the front case 6 at a lower open end portion $6A_1$. The magnetic switch 1 is also mounted to the front case 6 at an upper open end portion $6A_2$. The taper face 8, to which the dust cover 7 is to be fitted during a later step, is formed between the upper and lower open end portions $6A_1$ and $6A_2$ of the front case 6.

Figure 5:
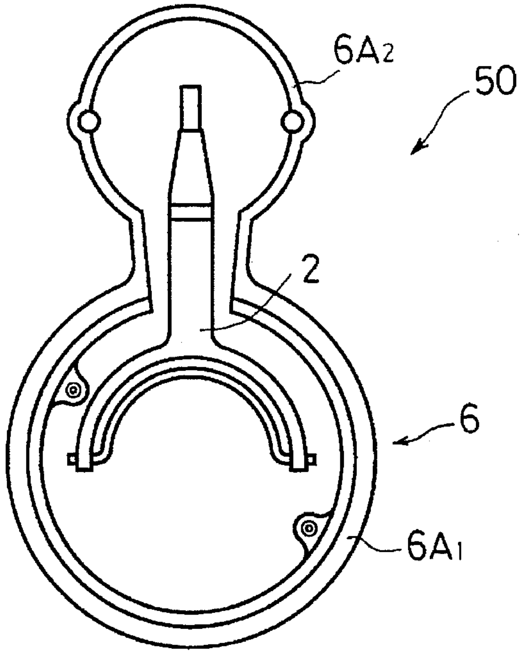
FIG. 5 is a view in which a shift lever is attached in the front case and is viewed from the open end of the front case.

Thus, the pinion 3, the shift lever 2, and the parts of the motor 5 toward the pinion 3 are mounted in the front case 6 as shown in FIG. 5. In FIG. 5, only the shift lever 2 is illustrated for simplification.

Figure 6:
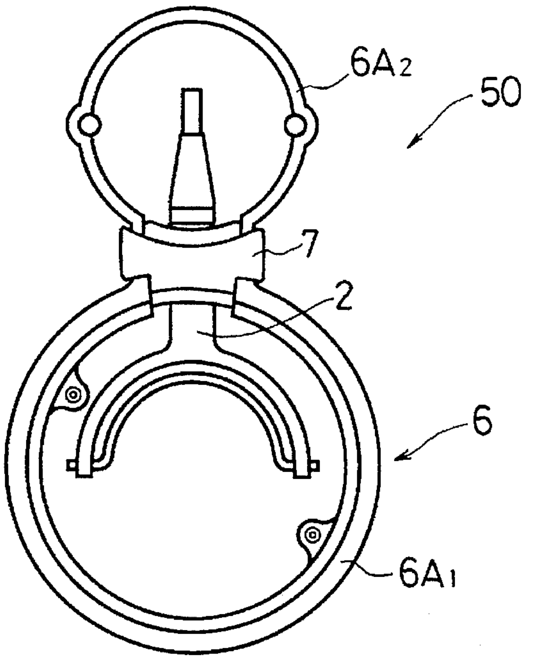
FIG. 6 is a view of the front case wherein the dust cover is inserted into a taper surface.
Figure 7:
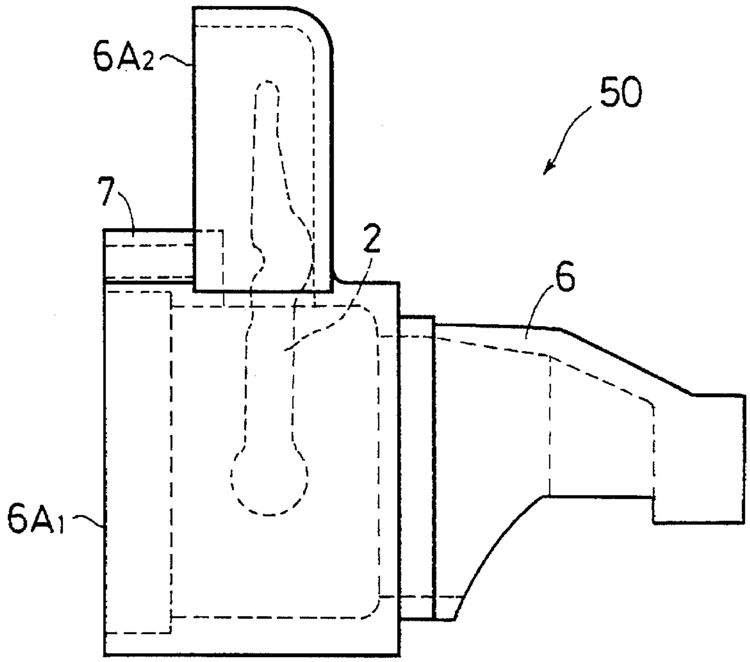
FIG. 7 is a side view of the front case with the dust cover inserted onto the taper surface.

Next, the dust cover 7 is fitted onto the taper face 8 from above as shown in FIGS. 6 and 7. FIG. 6 is a view from the open end 6A similar to FIGS. 10 and 5. FIG. 7 is a side view of the front case 6. To ensure a good seal, the width of the dust cover 7 (in the left/right direction in FIG. 6) is made a little larger than the width of the taper face 8 (left/right direction in FIG. 6). A strong force is required to push the dust cover 7 completely into the deepest and narrowest portion of the taper face 8 (downward in the drawing). In this step of assembly, it is not necessary to push the dust cover 7 completely into the taper face 8, rather it is sufficient to push the dust cover 7 lightly.

Figure 8:
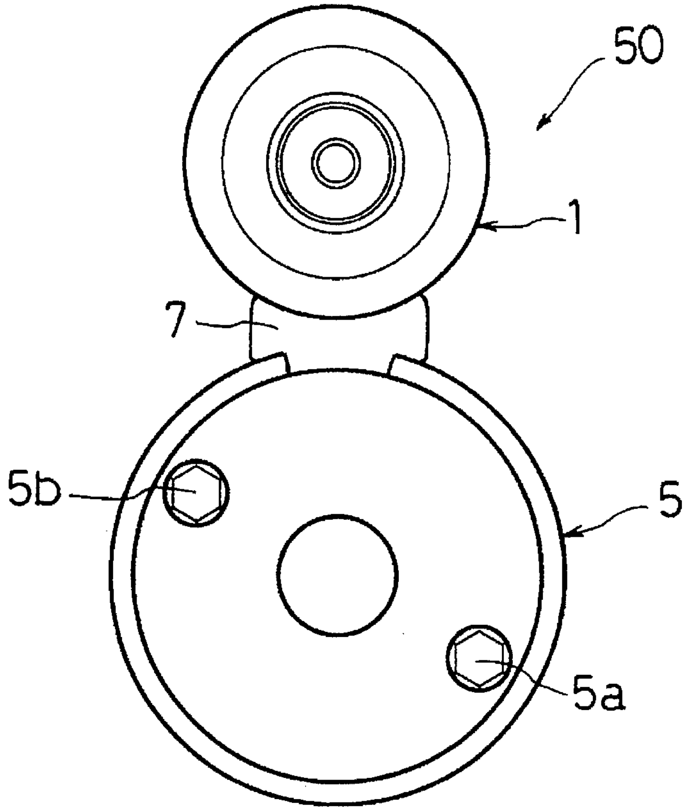
FIG. 8 is a view of an embodiment of the invention in which the magnetic switch and the motor are mounted in the front case.

Finally, the magnetic switch 1 and the motor 5 are mounted to the open end portions $6A_1$ and $6A_2$ of the front case 6, respectively. The dust cover 7 is placed between the magnetic switch 1 and the motor 5, as shown in FIG. 8. In FIG. 8, the magnetic switch 1 is fixed to the open end portion $6A_2$ by means of bolts (not shown) in the direction from the rear side toward the side shown in FIG. 8 (see also FIG. 7). The motor 5 is fixed to the open end portion $6A_1$ by means of bolts 5*a* and 5*b* (see FIG. 7). When assembled, the magnetic switch 1 pushes the dust cover 7 toward the motor 5 in the direction along which the taper face 8 becomes narrower (downward in the drawing). The dust cover 7 tightly contacts the taper face 8, the motor 5 and the magnetic switch 1.

According to the assembly process described above, the dust cover 7 is pushed in the direction toward the narrower width of the taper face 8 because the magnetic switch 1 and the motor 5 are assembled in the final step as shown in FIG. 8. The dust cover 7 is forcibly fitted into the taper face 8 and pushed and expanded to the deepest portion of the taper face 8. This ensures a good seal even if the interference between the dust cover 7 and the taper face 8 is not large. The interference may be small, so that the dust cover 7 may be assembled with a light force without deforming the dust cover 7 significantly. Thus, because the interference is small, the dust cover 7 may be easily assembled.

As described above, because the dust cover 7 is not forcibly pushed into the deepest portion of the taper face 8 until the final stages of assembly, the dust cover 7 may be initially attached to the taper face 8 with an improper fit and less deformation as shown in FIG. 6. Accordingly, the size of the dust cover 7 may be increased to produce a larger interference, to improve the seal between the dust cover 7 and the taper face 8. Also, the dust cover 7 is attached with a light force and insignificant deformation for easier assembly.

According to this embodiment of the starter 50, the seal portion 20 is provided in the vicinity of the open end 6A of the front case 6. The dust cover 7 is fitted into the taper face 8, with the axis of the taper face 8 substantially perpendicular to the longitudinal axis of the motor 5, so that the dust cover 7 contacts the magnetic switch 1 and the motor 5. The dust cover 7 is forced in the direction along which the taper face 8 becomes narrower. In a final stage of assembly, the dust cover 7 is forcibly pushed into the deepest portion of the taper face 8 so as to be fully expanded. In a previous assembly step, the dust cover 7 is attached with a light force without deforming the dust cover 7. Therefore, the dust cover 7 is easily assembled and produces a good seal.

Figure 9:
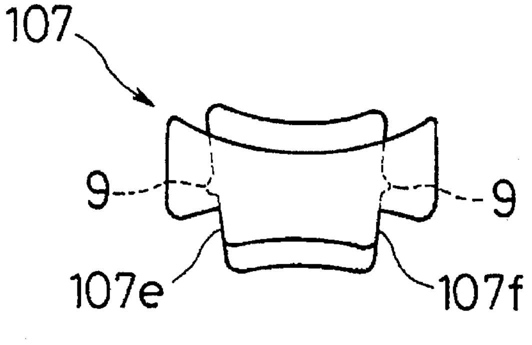
FIG. 9 is a front view of a second embodiment of the present invention showing the structure of a dust cover in the starter.

Next, referring to FIG. 9, a second embodiment of the invention is described. This embodiment comprises a dust cover with a different structure.

The structure of the dust cover 107 is shown in FIG. 9. FIG. 9 is a front view of the dust cover 107 and corresponds to the dust cover of the first embodiment shown in FIG. 3A. As shown in FIG. 9, the dust cover 107 of this embodiment is different from the dust cover of the first embodiment in that reverse taper protrusions 9, which prevent the dust cover 107 from coming off the taper face 8, are provided on surfaces 107*e* and 107*f* of the dust cover 107. These surfaces abut the taper face 8 formed in the front case 6. The structures of the other parts of the starter are substantially similar to those of the first embodiment.

According to the second embodiment, the dust cover 107 is fixedly held on the taper face 8 until the motor 5 and the magnetic switch 1 have been mounted to the front case 6 (the step of FIG. 8 in the first embodiment). This prevents the dust cover 107 from coming off the taper face 8 due to the vibrations or the like after the dust cover 107 has been attached to the taper face 8 (the process of FIGS. 6 and 7 in the first embodiment).

Figure 10A:
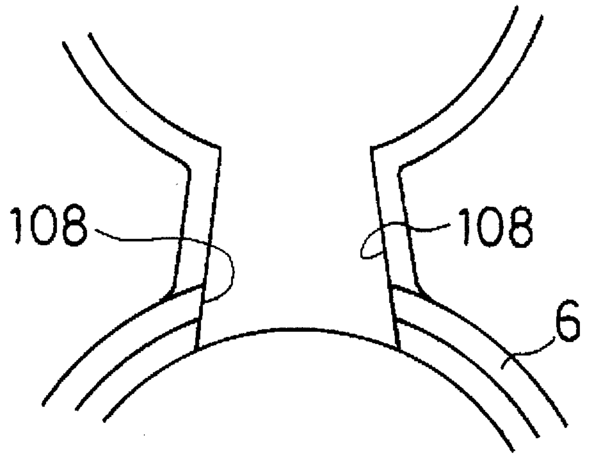
FIGS. 10A and 10B are enlarged views showing the structure of the front cover in the vicinity of the taper surface and a front view of the dust cover in the starter, respectively, according to a third embodiment of the present invention.
Figure 10B:
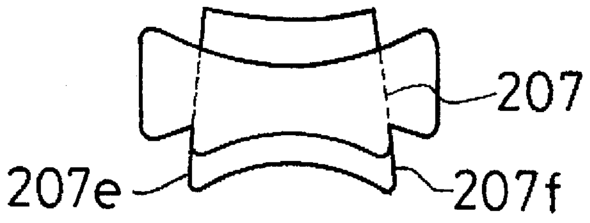

Next, referring to FIGS. 10A and 10B, a third embodiment of the present invention is described. This embodiment comprises a dust cover of different structure and a taper face which narrows in a different direction. Further, equivalent parts to those of the first embodiment are similarly referenced.

FIG. 10A is an enlarged view showing the structure in the vicinity of a taper face 108. FIG. 10B is a front view of a dust cover 207. This embodiment differs from the first embodiment in that the taper face 108 is narrower in the direction from the motor to the magnetic switch (upward in the drawing). This taper face 8 is reversed from the direction of taper of the first embodiment. Surfaces 207*e* and 207*f* of the dust cover 207 of this embodiment correspond to the shape of the taper face 108. In this embodiment, the dust cover 207 is urged in the direction from the motor 5 to the magnetic switch 1. The structures of the other parts of the starter are substantially the same as those of the first embodiment. Accordingly, it is possible to obtain the same effect with this embodiment as that of the first embodiment.

In embodiments one through three, the taper face is formed directly on the front case. However, the present invention is not limited to this structure. Rather, the taper face may be formed on an intermediate member or the like provided between the magnetic switch and the motor. For example, a shift lever is supported by a lever holder fixed in the front case and located between the magnetic switch and the motor. A taper face having an axis substantially perpendicular to the longitudinal axis of the motor is formed on the lever holder so that the dust cover on this taper face is urged toward the narrower width of the taper face. This embodiment has the same effect as the prior embodiments.

According to the present invention, the seal portion is provided in the vicinity of the open end of the front case. An elastic material is fitted into a taper face, which has an axis substantially perpendicular to the longitudinal axis of the motor. The elastic material is located between a magnetic switch and a motor so that it is urged toward the narrower width of the taper face. Accordingly, in the final assembly step, the elastic material is forcibly fitted onto the taper face so as to be pushed to the deepest portion of the taper face and expanded. Accordingly, it is possible to produce a good seal without significant interference between the elastic material and the taper face. Thus, because the interference is small, the elastic material is lightly forced into the taper face without significant deformation when the elastic material is assembled with the taper face. According to the present invention, a good seal is produced with easy assembly.

Further, since the elastic material comprises protrusions on the surface which contact the taper face, the elastic material is fixedly held on the taper face. It is thereby prevented from coming off the taper face due to vibrations inherent in the manufacturing process.

What is claimed is:

1. A starter comprising:

a shift lever for performing engagement and disengagement between a pinion and a ring gear of an engine;

a magnetic switch for actuating said shift lever;

a motor for driving said pinion;

a front case having an open end to which said magnetic switch and said motor are mounted substantially from the same direction, said pinion being enclosed in said front case;

a seal portion provided in the vicinity of said open end of said front case so as to seal a gap between the inside and the outside of said front case;

said seal portion including a taper face and an elastic material, said taper face having an axis the direction of which is substantially perpendicular to the longitudinal axis of said motor, said elastic material being fitted onto said taper face so as to be disposed between said magnetic switch and said motor, wherein said elastic material receives a force in the direction of narrowing width of the taper face.

2. A starter according to claim 1, wherein said taper face is formed on said front case, and wherein at least a part of a surface of said elastic material abuts against said magnetic switch, and at least a part of the surface of said elastic material abuts against said motor.

3. A starter according to claim 1, wherein said taper face narrows in the direction from said magnetic switch toward said motor and said elastic material receives a force in the direction from said magnetic switch toward said motor.

4. A starter according to claim 1, wherein said taper face narrows in the direction from said motor toward said magnetic switch and said elastic material receives a force in the direction from said motor toward said magnetic switch.

5. A starter according to claim 1, wherein said elastic material comprises at least one protrusion on a surface which contacts said taper face, wherein said protrusion holds said elastic material on the taper face.

6. A starter comprising:

a shift lever for performing engagement and disengagement between a pinion and a ring gear of an engine;

a magnetic switch for actuating said shift lever;

a motor for driving said pinion;

a front case having an open end to which said magnetic switch and said motor are mounted substantially from the same direction, said pinion being enclosed in said front case;

a seal portion provided in the vicinity of said open end of said front case so as to seal a gap between the inside and the outside of said front case;

said seal portion including a taper face and an elastic material, said taper face having an axis the direction of which is substantially perpendicular to a rotor shaft of said motor, said elastic material being fitted onto said taper face so as to be disposed between said magnetic switch and said motor, wherein said elastic material receives a force in the direction of narrowing width of the taper face.

* * * * *